(12) United States Patent
Bauer et al.

(10) Patent No.: US 9,611,997 B2
(45) Date of Patent: Apr. 4, 2017

(54) LED PROJECTION MODULE

(71) Applicant: ZIZALA LICHTSYSTEME GMBH, Wieselburg (AT)

(72) Inventors: Friedrich Bauer, Bergland (AT); Andreas Moser, Haag (AT)

(73) Assignee: ZKW GROUP GMBH, Wieselburg an der Erlauf (AT)

( * ) Notice: Subject to any disclaimer, the term of this patent is extended or adjusted under 35 U.S.C. 154(b) by 390 days.

(21) Appl. No.: 14/359,399

(22) PCT Filed: Nov. 5, 2012

(86) PCT No.: PCT/AT2012/050173
§ 371 (c)(1),
(2) Date: May 20, 2014

(87) PCT Pub. No.: WO2013/075157
PCT Pub. Date: May 30, 2013

(65) Prior Publication Data
US 2014/0321141 A1 Oct. 30, 2014

(30) Foreign Application Priority Data
Nov. 22, 2011 (AT) .................. A 1724/2011

(51) Int. Cl.
*F21V 5/00* (2015.01)
*F21S 8/10* (2006.01)
(Continued)

(52) U.S. Cl.
CPC .............. *F21S 48/13* (2013.01); *B60Q 1/085* (2013.01); *B60Q 1/1423* (2013.01); *F21K 9/61* (2016.08);
(Continued)

(58) Field of Classification Search
CPC .... F21S 48/13; F21S 48/1184; F21S 48/1159; F21S 48/1241; F21S 48/171;
(Continued)

(56) References Cited

U.S. PATENT DOCUMENTS 5,349,504 A * 9/1994 Simms ................. F21V 7/0091
362/249.02
2006/0023461 A1* 2/2006 Knight ................. B60Q 1/076
362/466
(Continued)

FOREIGN PATENT DOCUMENTS

DE 102007052696 A1 7/2008
EP 2280215 A2 2/2011
(Continued)

OTHER PUBLICATIONS

International Search Report of PCT/AT2012/050173 dated Mar. 8, 2013.
(Continued)

*Primary Examiner* — Jason Moon Han
(74) *Attorney, Agent, or Firm* — Eversheds Sutherland (US) LLP (57) ABSTRACT

An LED projection module (1) includes two or more LED light sources which each consist of one or more light-emitting diodes that couple light via a light coupling-in point associated therewith into an optical waveguide. Light exits from the optical waveguides via a light decoupling point. The exiting light is projected by a projection lens to form at least one light distribution. The optical waveguides for the individual LED light sources are arranged laterally side by side in a horizontal plane and border one another directly such that light can pass over between adjacent optical waveguides. The individual light outlet surfaces are arranged side by side and form a total-light light outlet surface. One or more indentations are provided in the
(Continued)

total-light light outlet surface, between the individual light outlet surfaces, and in each case extend at least over part of the vertical extension of the total-light light outlet surface.

32 Claims, 5 Drawing Sheets

(51) Int. Cl.
  *B60Q 1/08* (2006.01)
  *B60Q 1/14* (2006.01)
  *F21K 9/61* (2016.01)

(52) U.S. Cl.
  CPC ....... *F21S 48/1154* (2013.01); *F21S 48/1159* (2013.01); *F21S 48/1241* (2013.01); *F21S 48/171* (2013.01); *F21S 48/1747* (2013.01); *B60Q 2300/41* (2013.01); *B60Q 2300/42* (2013.01); *F21S 48/1721* (2013.01)

(58) Field of Classification Search
  CPC ............... F21S 48/1747; F21S 48/1721; F21S 48/1154; F21S 48/125; B60Q 1/085; B60Q 1/1423; B60Q 2300/41; B60Q 2300/42; B60Q 1/1243; F21K 9/52
  USPC ........ 362/555, 511, 235, 236, 247, 520–522, 362/538, 543–545
  See application file for complete search history.

(56) References Cited

U.S. PATENT DOCUMENTS

| | | | |
|---|---|---|---|
| 2007/0018181 A1* | 1/2007 | Steen | B60Q 1/072 257/98 |
| 2008/0080201 A1 | 4/2008 | Specht et al. | |
| 2010/0053987 A1* | 3/2010 | Nakabayashi | F21S 48/1154 362/538 |
| 2010/0226142 A1* | 9/2010 | Brendle | F21S 48/1388 362/512 |
| 2011/0122615 A1* | 5/2011 | Okada | F21S 48/1154 362/235 |
| 2012/0275173 A1 | 11/2012 | Hamm et al. | |
| 2013/0114277 A1 | 5/2013 | Faffelberger | |
| 2013/0194816 A1* | 8/2013 | Hager | F21S 48/115 362/487 |
| 2013/0215632 A1 | 8/2013 | Jackl et al. | |
| 2013/0223089 A1 | 8/2013 | Danner et al. | |
| 2013/0235605 A1 | 9/2013 | Bohm | |
| 2013/0308329 A1 | 11/2013 | Danner et al. | |
| 2014/0043843 A1 | 2/2014 | Moser et al. | |
| 2014/0169014 A1 | 6/2014 | Jungwirth et al. | |

FOREIGN PATENT DOCUMENTS

| | | |
|---|---|---|
| EP | 2306073 A2 | 4/2011 |
| EP | 2390561 A1 | 11/2011 |
| WO | 2013020156 A1 | 2/2013 |

OTHER PUBLICATIONS

First Office Action of priority Austrian Patent Application No. A 1724/2011 dated Sep. 14, 2012.

* cited by examiner

LED PROJECTION MODULE

The invention relates to an LED projection module, comprising two or more LED light sources, wherein each LED light source consists of one or more light-emitting diodes, wherein in each LED light source couples light via a coupling-in point associated therewith into an optical waveguide, and wherein light exits from the optical waveguides via a light decoupling point of the optical waveguide, and wherein the exiting light is projected by means of a projection lens into the outside space to form at least one light distribution.

The invention also relates to a headlight having one or more such modules.

Such LED light source modules for producing a light distribution, for example a main beam distribution or dipped headlight beam distribution, are known.

"Partial-light distributions" are also becoming, or are, of increasing interest in the field of vehicle headlight construction. In the case of such partial-light distributions, either only a specific part of the (total) light distribution is projected onto the roadway, or part of the (total) light distribution is "masked", such that only the remaining part of the light distribution can be seen on the roadway.

Such partial-light distributions are suitable for example for selectively illuminating certain areas, but preferably for masking areas in the light exposure. For example, even with oncoming traffic, it is possible to continue driving with main beam, and only the area in which the oncoming traffic is located is "masked" from the main beam distribution.

"Partial-light distributions", for example a partial main beam distribution, can thus also be produced by the use of a plurality of LED light sources, which can be actuated separately.

However, since each individual LED light source projects the light thereof via its own optical waveguide (and then via a common projection lens) onto the roadway, the problem is encountered that it is difficult or virtually impossible to produce a clear (vertical) transition between the light and the dark areas in the case of a partial-light distribution.

In the case of full light distribution (total-light distribution), in particular in the case of full main beam, it is difficult to implement a good superimposition of the individual partial-light exposures. However, a good superimposition is necessary for a high maximum in the light distribution and for good homogeneity.

The object is to create an improved LED projection module, with which the above-mentioned problems no longer occur or are at least significantly improved.

This object is achieved with an LED projection module of the type mentioned in the introduction in that, in accordance with the invention, the optical waveguides for the individual LED light sources are arranged laterally side by side in a horizontal plane and border one another directly or preferably form a common total-light optical waveguide, such that light can pass over between adjacent optical waveguides, and wherein the individual light outlet surfaces are arranged side by side and form a total-light light outlet surface, and wherein one or more indentations is/are provided in the total-light outlet surface, between the individual light outlet surfaces, and in each case extend at least over part of the vertical extension of the total-light light outlet surface.

Due to the forming of indentations in the total-light outlet surface, said surface is divided into a plurality of sub-areas. If all sub-areas are "activated", the total-light outlet surface is thus illuminated, without the gaps being visible in the light exposure. However, due to the gaps, the individual sub-areas can be clearly defined from one another in the light exposure, such that, with deactivation of one sub-area, scattered light from the other, luminous sub-areas does not have interfering effects in the unlit area of the light exposure.

The one or more indentations is/are gaps in the total-light outlet surface, wherein these gaps are preferably configured in such a way that total reflection occurs at the gaps for the light impinging there, such that, due to the gaps, no light can enter the adjacent optical waveguide.

Here, the term "common" total-light optical waveguide is to be understood to mean that, fundamentally, only one single optical waveguide is provided, which has a plurality of separate optical waveguide "segments" (individual optical waveguides), which converge in a common area. In practice, these are interconnected optics, which are preferably formed from one piece.

Here, the total-light light outlet surface is generally arranged in a plane that is normal to the optical axis of the module, that is to say to the optical axis of the projection lens. The total-light light outlet surface (and of course also the individual light outlet surfaces) is usually arranged here in the (vertical) plane containing the focal point of the projection lens and arranged normal to the optical axis of the lens, or in a plane running in the vicinity of the focal point.

However, the (planar) total-light light outlet surface may also run at an incline with respect to the optical axis, or the total-light light outlet surface may also be embodied predominantly in the form of a free-form surface (for example a surface adapted to the focal curve of the (projection) lens) in order to allow for example the light distribution, for example a main beam distribution, to run better upwardly in the light exposure.

The planar total-light light outlet surface ideally runs through the focal point of the projection lens, as is also advantageously the case with a free-form surface.

However, the light outlet surface may also be selectively defocused in order to thus control the harshness of the light/dark transition; the effects of chromatic aberration may also be influenced in this way.

In accordance with a specific embodiment, a central optical waveguide group comprising at least one optical waveguide is provided, wherein a left and a right optical waveguide group are also provided to the left and right of the central optical waveguide group respectively, wherein the left and/or the right optical waveguide group in each case comprise/comprises at least one optical waveguide with associated LED light source.

Each of these optical waveguide groups, which in each case form a (partial-light) light outlet surface, produces its own partial-light exposure, such that a total of three partial-light exposures can be produced.

The middle optical waveguide group preferably comprises exactly one optical waveguide.

The left and/or the right optical waveguide group in each case also advantageously comprise/comprises exactly one optical waveguide.

Furthermore, the light of the at least one LED light source of the central optical waveguide of the central optical waveguide group can be directed from the central optical waveguide, in particular from the light inlet surface of the central optical waveguide, substantially parallel to the optical axis of the module.

Furthermore, the at least one LED light source of a side optical waveguide group can feed light at an angle not equal to 0°, directed to the optical axis of the module, into the associated optical waveguide.

This has the advantage that a compact total-light light outlet surface with desired dimensions is achieved, but, at the same time, sufficient installation space for fitting the LED light sources is provided.

In order to achieve the desired effect of the indentations over the entire vertical extension of the light outlet surface where possible, an indentation between two light outlet surfaces extends upwardly away from the lower delimiting surfaces of the optical waveguides arranged side by side or the lower delimiting surface of the total-light optical waveguide.

In the above sense, it is also expedient if the indentation between two light outlet surfaces extends completely as far as the upper delimiting surfaces of the optical waveguides arranged side by side or as far as the upper delimiting surface of the total-light optical waveguide.

However, the indentation between two light outlet surfaces also may not extend completely as far as the upper delimiting surfaces of the optical waveguides arranged side by side or as far as the upper delimiting surface of the total-light optical waveguide, such that a continuous edge is produced in the upper region of the optical waveguides arranged side by side or of the total-light optical waveguide. This embodiment is then advantageous if, as will also be explained further below, a dipped light distribution, for example a dipped headlight beam distribution, is additionally to be produced with the module, wherein the upper (continuous) edge of the total optical waveguide is then used to produce a (continuous) light/dark border in the light exposure.

It is further expedient if an indentation in a front region, that is to say in the region of the light outlet surfaces, has a defined width, which is preferably constant over the entire height of the indentation, and if the indentation tapers rearwardly, in a manner directed away from the light outlet surfaces.

In particular, it is favourable if the walls delimiting an indentation run towards one another and preferably converge in an acute angle.

In addition, the inner wall of an indentation, that is to say the wall facing the central optical waveguide group, may be configured in a planar manner, preferably as a vertical plane.

Furthermore, the outer wall of an indentation may be curved, preferably curved away from the inner wall.

Here, an indentation is primarily preferably designed, that is to say is configured in terms of its form and/or in terms of the length of its extension rearwardly, away from the light outlet surface(s), in such a way that light from the right/left optical waveguide group or from the at least one right/left optical waveguide cannot enter the left/right optical waveguide group or the at least one left/right optical waveguide.

Light from the right optical waveguide is totally reflected at the indentation/gap between the left and the middle optical waveguide (more specifically at the straight wall), and thus exits via the middle optical waveguide (or the middle optical waveguide group). The same is true for light from the left optical waveguide, this light being totally reflected at the indentation/gap between the right and the middle optical waveguide and exiting from the module via the middle optical waveguide.

A clear vertical light/dark border can thus be produced in the light exposure.

The depth of the incision or indentation is selected in such a way that light from a side LED light source cannot reach the outer opposite optical waveguide.

It is further expedient if the light coupling-in point for the middle optical waveguide is brought forward in the direction of the light outlet surface and is formed such that light from a side LED light source cannot pass by the indentation.

Specifically, the total optical waveguide can be configured on the rear side thereof, facing away from the light decoupling surfaces, in such a way that light rays from one outer light source cannot exit through a light decoupling surface associated with another outer LED light source, wherein rear-side indentations are preferably provided which block light from the outer LED light sources, which light would otherwise pass into the optical waveguide associated with another outer LED light source.

To this end, the total optical waveguide in the middle is, for example, brought forwards in the direction of the light outlet surfaces, in such a way that light which could pass by the front-side indentations into an outer optical waveguide, wherein this light originates from an outer light source not associated with this optical waveguide, is blocked and optionally reflected.

In a variant, this brought-forward area in the middle of the total optical waveguide is formed as a light coupling-in point for a middle LED light source.

A main beam with inhomogeneity in the gap region, which is undesirable, is created in the superimposition of all light components as a result of the gap. Due to the use of a curved wall, this can be adapted accordingly to the optical conditions, such that the inhomogeneities can be prevented or at least mitigated.

In a further variant, an indentation may be designed, that is to say configured in terms of its form and/or in terms of the length of its extension rearwardly, in a manner directed away from the light outlet surface(s), in such a way that light from the middle optical waveguide group or from the at least one middle optical waveguide cannot enter the left or right optical waveguide group or the at least one left or at least one right optical waveguide.

In this case, it should be ensured in particular that the light coupling-in point for the middle LED light source is configured accordingly, for example is curved accordingly, so that, in conjunction with the one or more indentations, no light rays can enter the side optical waveguides.

In this case, the middle optical waveguide group can also be used for the partial-light distribution, and the middle optical waveguide group or the middle optical waveguide can already be switched on with passing oncoming traffic, without dazzling said traffic.

In accordance with a specific embodiment, a main beam distribution or a partial main beam distribution can be produced by means of the optical waveguide or by means of the total-light optical waveguide.

To this end, the individual LED light sources can be actuated independently of one another and can be switched on and off accordingly or, where appropriate, can also be dimmed. It may also be advantageous for each light-emitting diode of an LED light source to likewise also be actuatable separately.

As already mentioned in the introduction, in order to additionally also be able to produce with a module according to the invention a dipped light distribution, for example a dipped headlight beam distribution, at least one LED light source may also further be arranged above the optical waveguide or the total-light optical waveguide, said LED light source emitting light onto at least one optic, for example at least one reflector, and wherein the light emitted from the at least one optic, for example from the at least one reflector, is radiated into a lower region of the projection lens, and wherein the upper edge, which delimits the total-light light outlet surface, is reproduced as a light/dark border in the light exposure.

With the optics, for example in the form of reflectors, lenses or preferable primary optics, said primary optics being formed as optical waveguides (for example with the form of a reflector or as shown in AT504505), or the like, a dipped headlight beam distribution is reproduced in the focal plane of an associated lens, which is then reproduced in front of the vehicle by the lens.

Here, two LED light sources, each with an associated reflector, are provided, for example.

It is advantageous if the upper side and/or the underside of the optical waveguides or of the total-light optical waveguide is/are configured so as to reflect the light at least in regions.

For example, the upper side and/or underside is/are coated, for example coated with a reflective layer, for example coated by means of vapour deposition.

The underside/upper side can be configured here for example in a reflecting manner in a rear region and in an absorbing manner at the edge in order to obtain a clear LD line.

Light losses can thus be avoided, or, if two different light distributions are produced, these can be prevented from influencing one another negatively as a result of permeating light.

With regard to the profile thereof, the edge is then preferably configured so as to form a light/dark border for a dipped headlight beam distribution, that is to say has corresponding portions in order to produce a dipped headlight beam distribution conforming to legal requirements.

The invention, as already mentioned in the introduction, also relates to a headlight comprising one or preferably more of the above-described modules.

In the case of such a headlight, at least one of the modules, and preferably all modules, is/are preferably pivotable about a substantially vertical axis.

If the entire module is pivotable, the pivot axis then runs ideally through the centre of gravity of the module. A minimal application of force is thus necessary, and vibrations or the like have only little impact.

By means of one or more movable modules, sub-areas in the light exposure can not only be "cut out" statically, but this cut-out sub-area can also be pivoted by pivoting the module about the vertical axis (with the total-light exposure produced by the respective pivoted module). It is thus possible to track the cut-out light portion in accordance with the movement of the oncoming traffic or vehicles driving in front.

However, in a more cost-effective embodiment, there may also be no pivoting, whereby an automatic main beam can nevertheless be activated again much earlier than without the possibility of the static masking of sub-areas.

Instead of the pivoting of the entire module, the projection lens of one or more modules may also be pivoted about one or more respective vertical axes.

Here, it is optically optimal if the axis close to the focal line of the projection lens preferably runs through the focal point of the projection lens.

The invention will be explained in greater detail hereinafter on the basis of the drawing, in which.

Figure 5:
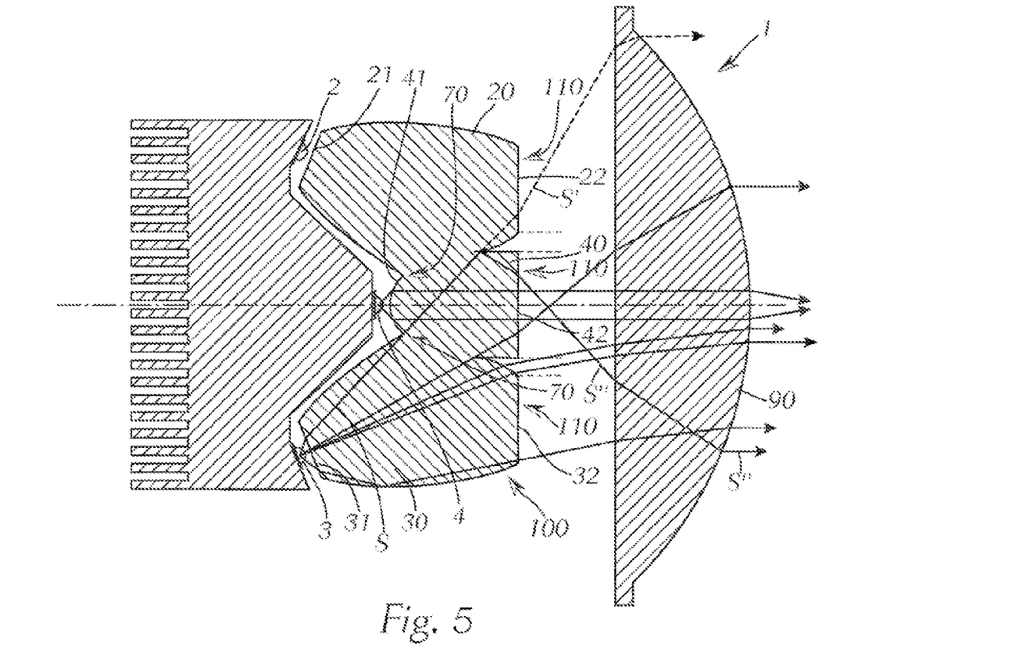
FIG. 5 shows a section along the line B-B from FIG. 1.

FIGS. 1-5 show an LED projection module 1 according to the invention. The module 1 consists of a total-light optical waveguide 100, which will also be referred to hereinafter as a fibre optic element 100. In this fibre optic element 100, light is coupled into the fibre optic element 100 from 3 LED light sources 2, 3, 4 (FIG. 2), each of which consists of one or more light-emitting diodes, via corresponding light coupling-in points 21, 31, 41 (FIG. 5). For example, the light coupling-in points are light-collimating coupling-in points, that is to say an opening so to speak in which the respective LED light source sits and is enclosed by a spherical shell in order to collimate the light. The light exits again from the fibre optic element 100 via light decoupling points 22, 32, 42, and the exiting light is projected by means of a projection lens 90 into the outside space to form a light distribution, in the specific case to form a main beam distribution or partial main beam distribution.

A main beam distribution or a partial main beam distribution is produced by means of these LED light sources 2, 3, 4. To this end, the individual LED light sources can be actuated independently of one another, and accordingly can be switched on and off or, where appropriate, can also be dimmed. It may also be advantageous for each light-emitting diode of an LED light source to likewise also be actuatable separately.

Each light decoupling point 22, 33, 42 is configured on an optical waveguide 20, 30, 40, and these three optical waveguides together form the fibre optic element 100. In the shown preferred embodiment of the invention, the three optical waveguides 20, 30, 40 are configured here from one piece.

The optical waveguides 20, 30, 40 for the individual LED light sources 2, 3, 4 are arranged laterally side by side in a horizontal plane, border one another directly and preferably form, as already mentioned above, an integral total-light optical waveguide 100, such that light can pass over between adjacent optical waveguides 20, 30, 40.

The individual light outlet surfaces 22, 32, 42 are arranged side by side and form a total-light light outlet surface 110. Indentations 201, 202 are provided in the total-light light outlet surface 100, between the individual light outlet surfaces 22, 32, 42, and in each case extend at least over part of the vertical extension (that is to say in the vertical direction) of the total-light light outlet surface 110.

The light emitted from the LED light source 4 is directed in the shown example from the light inlet surface 41 of the central optical waveguide 40 substantially parallel to the optical axis of the module 1.

Figure 2:
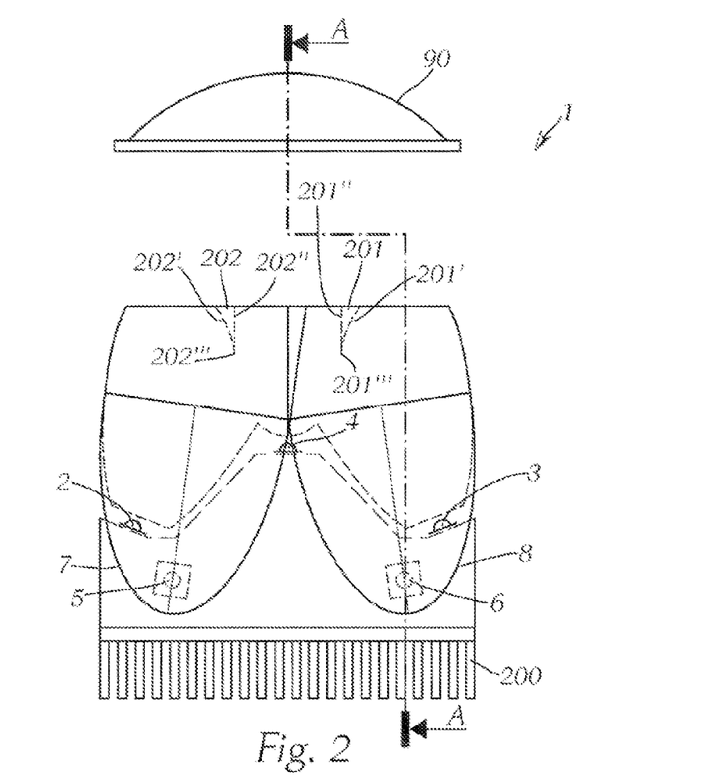
FIG. 2 shows the module from FIG. 1 in a view from above.
Figure 3:
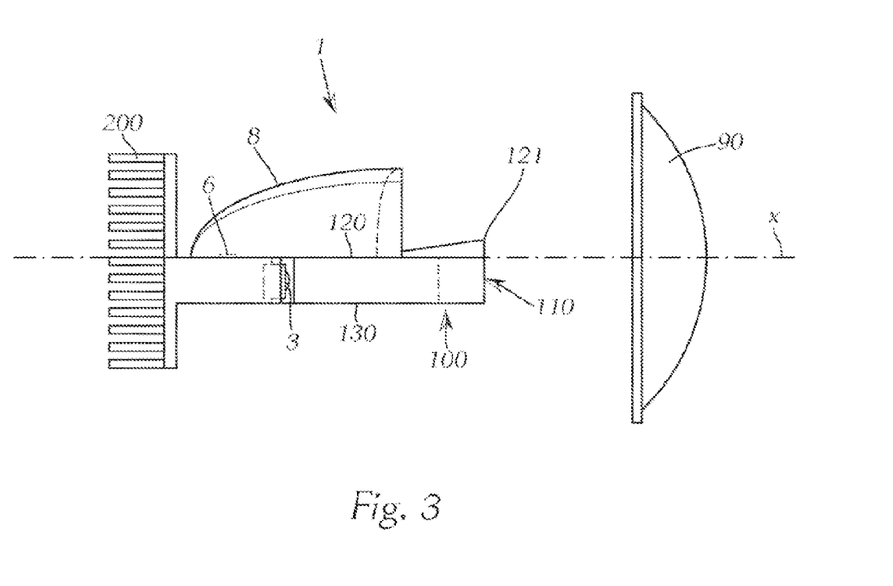
FIG. 3 shows the module from FIG. 1 in a side view.
Figure 4:
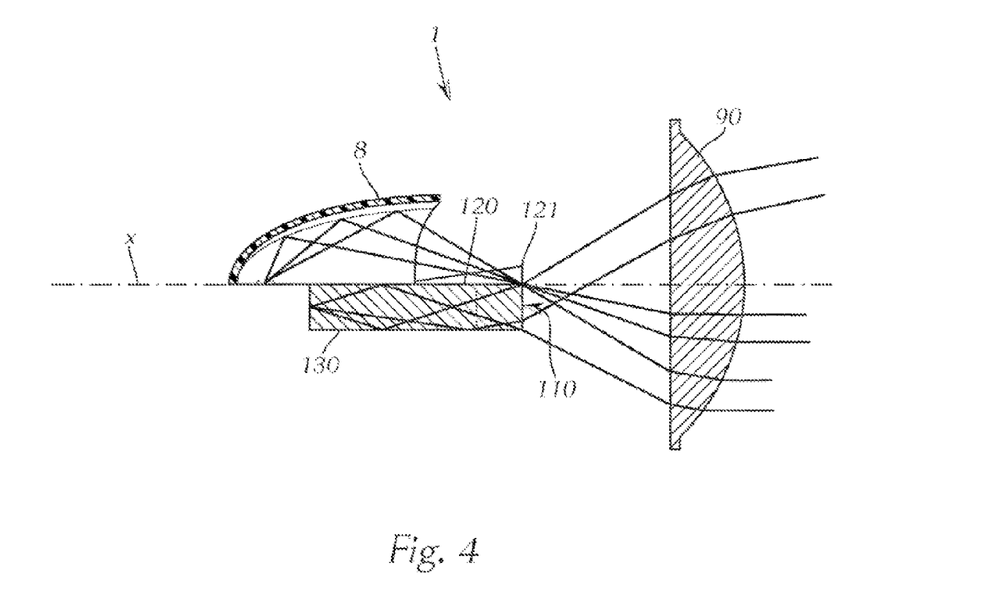
FIG. 4 shows a section along the line A-A from FIG. 2.

The at least one LED light source 2, 3 of the respective side optical waveguide 20, 30 is directed in the shown example at an angle not equal to 0°, directed to the optical axis x of the module, and thus feeds light into the associated optical waveguide 20, 30 (FIG. 2).

This has the advantage that a compact total-light light outlet surface 100 with desired dimensions is achieved, but, at the same time, sufficient installation space for fitting the LED light sources is provided.

Here, the LED light sources are arranged on a heat sink 200 (FIG. 2). The LED light sources 5, 6 also discussed further below, which are used to produce a dipped headlight beam distribution, are also fitted on this heat sink 200.

One aspect of the invention is to also produce, besides a total-light light distribution (for example a main beam light distribution), in which all three LED light sources 2, 3, 4 are switched on, partial-light light distributions, in the present case a partial main beam light distribution, in which for example only one LED light source is active or not all LED light sources are active. The indentations 201, 202 are provided in order to obtain here a vertically clearly defined partial main beam light, without interfering light from the other active LED light source(s).

In order to achieve the desired effect of the indentations over the entire vertical extension of the light outlet surface where possible, an indentation 201, 202 between two light outlet surfaces 32, 42; 22, 42 extends directly upwardly away from the lower delimiting surface 130 of the total-light optical waveguide 100.

In the shown variant, the indentation 201, 202 between two light outlet surfaces 32, 42; 22, 42 does not extend completely as far as the upper delimiting surface 120 of the total-light optical waveguide 100, such that a continuous edge 121 is produced in the upper, front region of the total-light optical waveguide 100. This embodiment is then advantageous if, as will also be discussed further below, a dipped light distribution, for example a dipped headlight beam distribution, is additionally to be produced with the module, wherein the upper (continuous) edge 121 of the total optical waveguide is then used to produce a (continuous) light/dark border in the light exposure of the dipped headlight beam.

It is further expedient if the indentations 201, 202 in a front region, that is to say in the region of the light outlet surfaces 22, 32, 42, 110, have a defined width which is preferably constant over the entire height of the indentation 201, 202. The indentations 201, 202 taper rearwardly, in a manner directed away from the light outlet surfaces 22, 32, 42; 110.

Figure 5A:
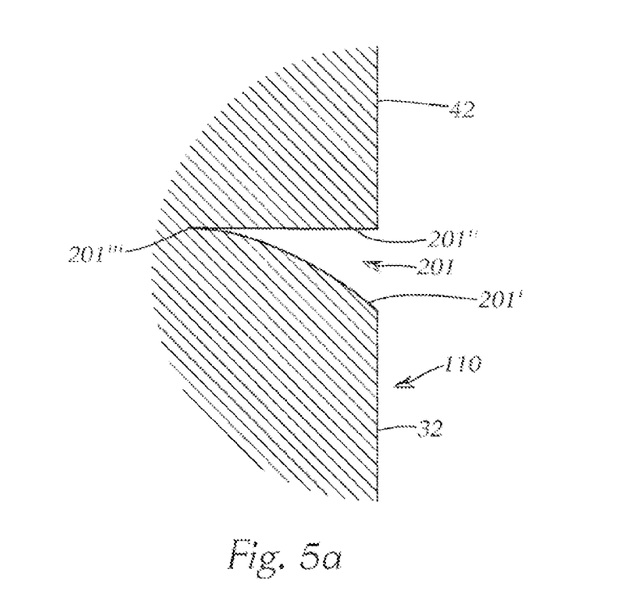
FIG. 5a shows a detail of the optical waveguide in the region of an indentation.

As can be seen clearly in particular in FIG. 5a, it is favourable if the walls 201', 201"; 202', 202" delimiting the indentations 201, 202 run towards one another and preferably each converge at an acute angle 201''', 202'''.

The inner walls 201", 202" of an indentation 201, 202, that is to say the walls facing the central optical waveguide group, are configured in a planar manner, preferably as a vertical plane. However, it is also conceivable in principle for these walls to be curved. A condition for this side face is that it is totally reflective for rays of the opposite LEDs (2 or 3).

The outer walls 201', 202' of the indentations 201, 202 are curved, preferably curved away from the inner wall 201", 202".

Generally, an indentation 201, 202 is designed, that is to say configured in terms of its form and/or in terms of the length of its extension rearwardly, away from the total-light outlet surface, in such a way that light from the right/left optical waveguide 20, 30 cannot enter the left/right optical waveguide 30, 20.

FIG. 5 shows a denoted light ray S from the right optical waveguide 30 from the LED light source 3, which light ray, without an indentation 202, would enter the left optical waveguide 20 as S' and would exit via the light outlet surface 22. In the case of partial main beam (that is to say switched-off LED light source 2 and possibly switched-off LED light source 4), light would thus exit via the light outlet surface 22 and would interfere with or destroy the partial main beam.

However, light from the right optical waveguide is thus reflected totally at the indentation/gap 202 between the left and the middle optical waveguide (more specifically at the straight wall 202") and thus exits via the middle optical waveguide (light ray S"). The same is true for light from the left optical waveguide, this being reflected totally at the indentation/gap between the right and the middle optical waveguide and exiting from the module via the middle optical waveguide.

A clear vertical light/dark border can thus be produced in the light exposure if the left/right and possibly the middle LED light source is/are switched off.

The depth of the incision or indentation is selected in such a way that light from a side LED light source cannot pass into the outer opposite optical waveguide.

To this end, it is further expedient if the light coupling-in point 41 for the middle optical waveguide 40 is brought forward in the direction of the light outlet surface and is embodied such that light from a side LED light source cannot pass by the indentation. Here, the light coupling-in point 41 is preferably curved, for example curved away from the LED light source 4, such that an indentation 70 is produced on the rear side of the total optical waveguide 100. In the shown example, the light inlet surface 41 even acts here as a lens, which directs the light of the LED light source in parallel.

A main beam with inhomogeneity in the gap region, which is undesirable, is produced in the superimposition of all light components as a result of the gap. Due to the use of a curved wall 201', 202', this wall can be adapted accordingly to the optical conditions, such that the inhomogeneities can be avoided or at least mitigated.

The middle LED light source 4 generates a maximum in the light exposure. This is the case illustrated in the figure. To this end, the light coupling-in point of the LED light source 4 is formed in such a way that the rays are directed substantially in parallel and produce a light maximum in the middle of the light distribution (see FIG. 9).

However, this does not necessarily have to be the case. It is of course also conceivable for the coupling-in point to be formed such that only some of the emitted light produces a maximum, preferably the part of the light of average luminous intensity, and for side regions of the emitted light to contribute to the width. This situation is not illustrated in the figures.

FIG. 5 has been adapted for the first-mentioned situation, therefore the ray path of the LED light source 4 is corrected slightly here.

In another variant (not shown), the indentations can be designed, that is to say configured in terms of their form and/or in terms of the length of their extension rearwardly, in a manner directed away from the light outlet surface(s), in such a way that light from the middle optical waveguide group or from the at least one middle optical waveguide 40 cannot enter the left or right optical waveguide group or the at least one left or at least one right optical waveguide 20, 30.

In this case, it should be ensured in particular that the light coupling-in point for the middle LED light source is configured accordingly, for example is curved accordingly, so that, in conjunction with the one or more indentations, no light rays can enter the side optical waveguides.

In this case, the middle optical waveguide group can also be used for the partial-light distribution, and the middle optical waveguide group or the middle optical waveguide can be switched on already with passing oncoming traffic, without dazzling said traffic.

As already mentioned in the introduction, in order to additionally also be able to generate with a module according to the invention a dipped light distribution, for example a dipped headlight beam distribution, at least one LED light source, preferably two or more LED light sources 5, 6, may also further be arranged above the total-light optical waveguide 100 and may emit light onto at least one reflector, preferably two or more reflectors 7, 8, or optics. The light emitted from the reflectors 7, 8 is radiated into a lower region of the projection lens 90 (FIG. 4), wherein the upper edge 121, which delimits the total-light light outlet surface 110, is reproduced as a light/dark border in the light exposure of the dipped headlight beam.

Reflectors 7, 8 are used in the embodiment shown in the figures, however any other (primary) optics suitable for this purpose can be used in principle instead of a reflector.

It is advantageous if the upper side 120 and/or the underside 130 of the total-light optical waveguide 100 is/are reflective.

For example, the upper side and/or underside is/are coated, for example coated with a reflective layer, for example coated by means of vapour deposition.

Light losses can thus be avoided, or, if two different light distributions are produced, these can be prevented from influencing one another negatively as a result of permeating light.

Figure 1:
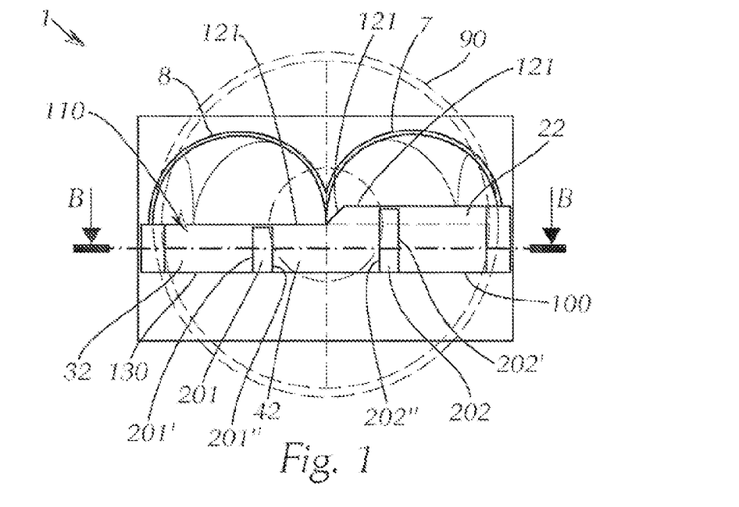
FIG. 1 shows a schematic view of an LED light module from the front with lens illustrated by a dashed line.

In terms of the profile thereof, the edge 121 is then preferably configured so as to form a light/dark border for a dipped headlight beam distribution, that is to say has corresponding portions in order to produce a dipped headlight beam distribution conforming to legal requirements (this is indicated by a dashed line in FIGS. 10-12) (FIG. 1).

A vehicle headlight consists of one or preferably more of the above-described modules.

In the case of such a headlight, at least one of the modules, preferably all modules, is/are pivotable about a substantially vertical axis.

By means of one or more movable modules, sub-areas in the light exposure cannot only be "cut out" statically, but this cuts-out sub-area can also be pivoted by pivoting the module about the vertical axis (with the total-light exposure produced by the respective pivoted module). It is thus possible to track the cut-out light portion in accordance with the movement of the oncoming traffic or vehicles driving in front.

However, in a more cost-effective embodiment, there may also be no pivoting, whereby an automatic main beam can be activated again much earlier, without the possibility of the static masking of sub-areas.

Instead of the pivoting of the entire module, the projection lens of one or more modules can also be pivotable about one or more respective vertical axes.

It is optically optimal here if the pivot axis runs through the focal point of the projection lens.

Figure 6:
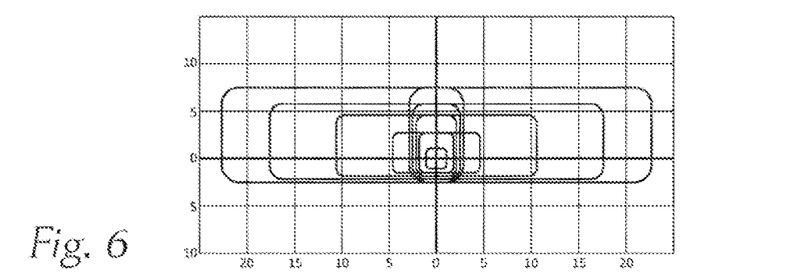
FIG. 6 shows the light distribution produced with the two outer optical waveguides.

FIG. 6 shows a combined light exposure from the left and right optical waveguides 20, 30 of an LED light source module. This alone may be sufficient to produce a main beam conforming to legal requirements, the required maximum in the middle being achieved by the superimposition of the light exposures in this region. In the minimum configuration, the module thus comprises only a left and a right LED light source.

Optionally, an increase of the maximum, as shown in the figures, can be achieved by a third LED light source 4 in the middle of the total optical waveguide.

Figure 7:
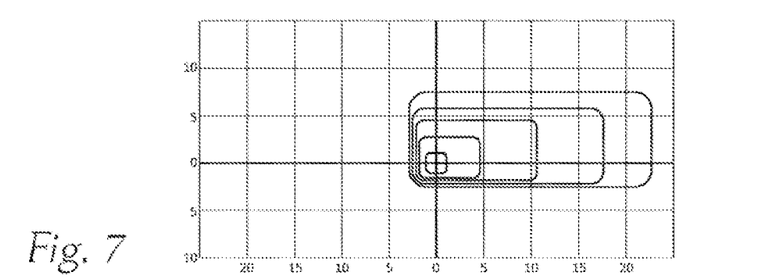
FIG. 7 shows the light distribution produced with the partial optical waveguide arranged to the left as viewed in the light exit direction.
Figure 8:
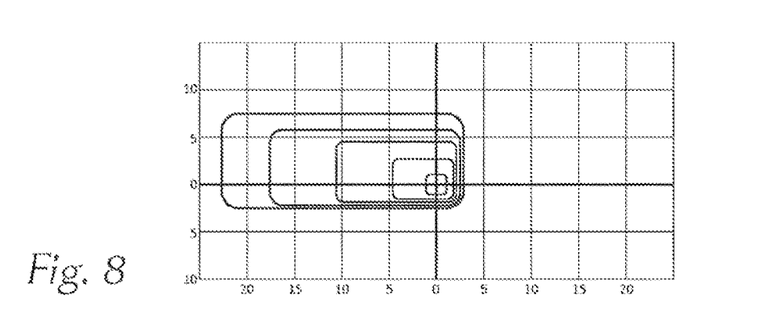
FIG. 8 shows the light distribution produced with the partial optical waveguide arranged to the right as viewed in the light exit direction.
Figure 9:
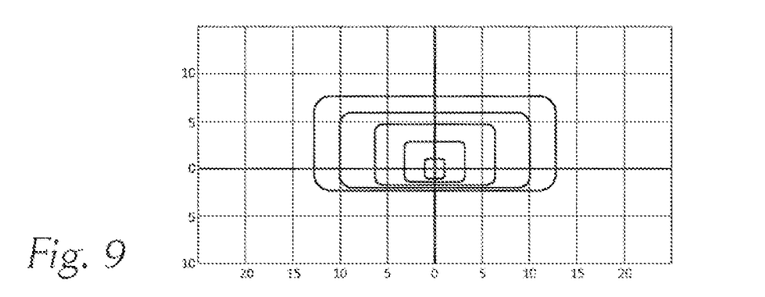
FIG. 9 shows the light distribution produced with the partial optical waveguide arranged in the middle as viewed in the light exit direction.

FIG. 7 shows a partial-light exposure produced with the left optical waveguide of an LED light source module according to the invention, FIG. 8 shows a partial-light exposure produced with the right optical waveguide, and FIG. 9 shows a light exposure produced with the middle optical waveguide.

Figure 10:
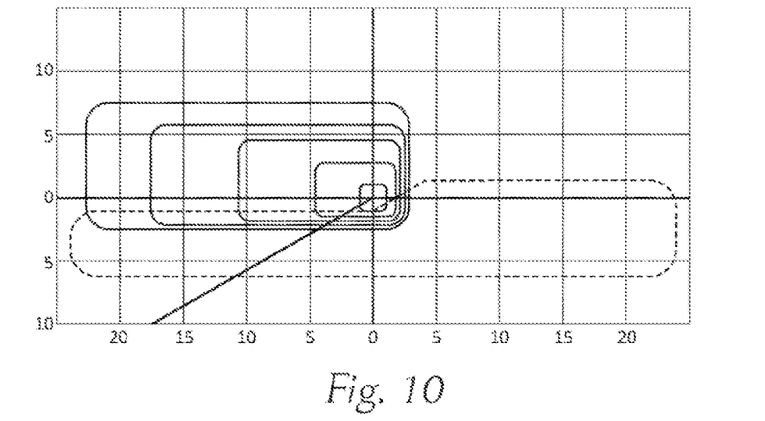
FIG. 10 shows the light distribution produced with a headlight (dipped headlight beam +partial main beam)

FIG. 10 shows a light distribution produced with an overall headlight. Specifically, FIG. 10 here shows a dipped headlight beam distribution (illustrated schematically by dashed lines) produced with the two LED light sources 5, 6 of the individual modules of the headlight, and, superimposed, a partial main beam generated with the right optical waveguides of the corresponding LED light source module.

Figure 11:
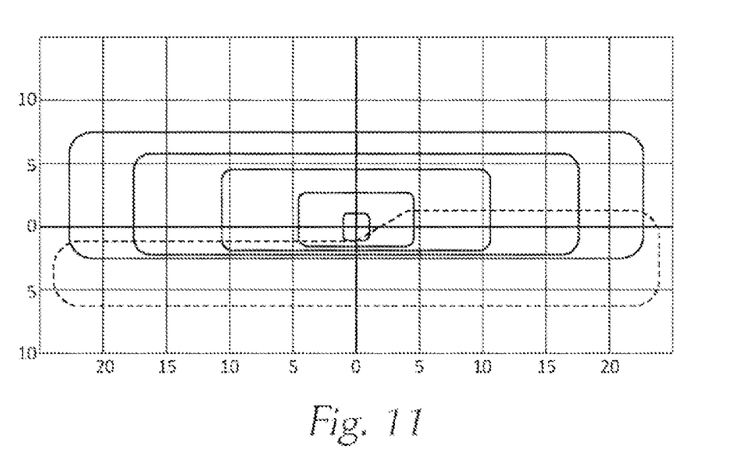
FIG. 11 shows the light distribution with main beam (full main beam), and FIG. 12 by way of example shows an adaptive main beam produced with two headlights according to the invention.

FIG. 11 shows a total main beam distribution produced by two headlights, together with a dipped headlight beam distribution, that is to say a light distribution in which all LED light sources 2, 3, 5, 6 and optionally also the LED light source 4 are in operation.

Figure 12:
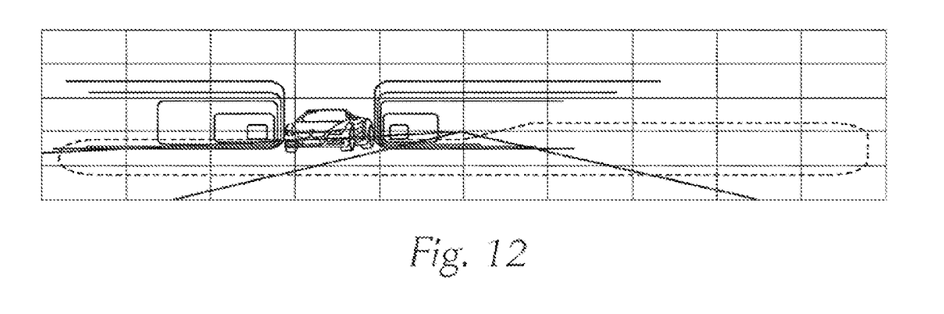

FIG. 12 lastly shows an adaptive main beam, which is produced with two headlights according to the invention, wherein both headlights have an identical construction with regard to the modules 1, as are shown in FIGS. 1-5.

The light distribution illustrated in FIG. 12 is produced in that the LED light source 3 (and optionally the LED light source 4) is (are) activated in the left headlight, and the modules or lenses thereof are pivoted to the left.

In principle, each headlight consists of at least one module, and generally a plurality of modules. Here, all modules can be arranged rigidly, or only one module or some modules is/are pivotable (or lenses thereof), and other modules are arranged rigidly; preferably, all modules (lenses) are pivotable.

If the dipped headlight beam units are separate from the main beam units (contrary to that shown in the figures), the dipped headlight beam can remain unpivoted, and only the main beam (partial main beam) may follow the oncoming traffic or be adapted thereto. Such a solution, however, is more costly than that as shown in the figures.

In the case of the right headlight, the LED light sources 2 (that is to say the left LED light sources) of the modules (and optionally the LED light sources 4, that is to say the middle LED light sources) are active, wherein the module or lens, under some circumstances, can be entrained/pivoted here slightly to the left or remains rigid.

If a plurality of vehicles are encountered in the oncoming traffic, it may be necessary to mask the entire light distribution occurring to the left of the oncoming traffic and in the path of the oncoming traffic, and in this case the left LED light sources 2 (and optionally the middle LED light sources 4) would be active in the case of the left headlight, the light exposure of said light sources being entrained by pivoting where appropriate, and the left LED light sources 2 (and optionally the middle LED light sources 4) are likewise active in the case of the right headlight.

In principle, it is possible to respond optimally to the respective traffic situation (oncoming traffic and/or traffic on the same side of the road, number of vehicles, position of the oncoming traffic, etc.) by arbitrary activation of the different partial-light distribution produced by the two headlights, and by pivoting of the light exposures of the individual modules where appropriate.

With use of a plurality of modules as already discussed above, one of said modules (or the lens) can be pivotable for example, and a further module or a plurality of further modules is/are static. The right module thus stays fixed (or is fixed) and illuminates (with right-hand traffic) the right-hand edge of the roadway, the left module being pivoted with the oncoming traffic.

The invention claimed is:

1. An LED projection module (1), comprising:
   two or more LED light sources (2, 3, 4), wherein each LED light source (2, 3, 4) consists of one or more light-emitting diodes,
   wherein each LED light source (2, 3, 4) couples light via a light coupling-in point (21, 31, 41) associated therewith into an optical waveguide (20, 30, 40), and wherein light exits from the optical waveguides (20, 30, 40) via a light decoupling point (22, 32, 42) of the optical waveguide (20, 30, 40), and wherein the exiting light is projected by means of a projection lens (90) into the outside space so as to form at least one light distribution,
   wherein the optical waveguides (20, 30, 40) for the individual LED light sources (2, 3, 4) are arranged laterally side by side in a horizontal plane and border one another directly or form a common total-light optical waveguide (100), such that light can pass over between adjacent optical waveguides (20, 30, 40), and wherein the individual light outlet surfaces (22, 32, 42) are arranged side by side and form a total-light light outlet surface (110), and wherein one or more indentations (201, 202) are provided in the total-light light outlet surface (110), between the individual light outlet surfaces (22, 32, 42), and in each case extend at least over part of the vertical extension of the total-light light outlet surface (110) and provide total reflection for the light impinging the one or more indentations.

2. The module according to claim 1, wherein a central optical waveguide group comprising at least one optical waveguide (40) is provided, and a left and right optical waveguide group are provided to the left and to the right of the central optical waveguide group respectively, wherein the left and/or the right optical waveguide group in each case comprises at least one optical waveguide (20, 30) with associated LED light source (2, 3).

3. The module according to claim 2, characterised in that the central optical waveguide group comprises exactly one optical waveguide (40).

4. The module according to claim 2, wherein the left and/or the right optical waveguide group in each case comprises exactly one optical waveguide (20, 30).

5. The module according to claim 2, wherein the light of the at least one LED light source (4) of the central optical waveguide (40) of the central optical waveguide group is directed from the central optical waveguide (40) substantially parallel to the optical axis of the module.

6. The module according to claim 5, wherein the light of the at least one LED light source (4) of the central optical waveguide (40) is directed from the light inlet surface (41) of the central optical waveguide (40).

7. The module according to claim 2, wherein the at least one LED light source (2, 3) of a side optical waveguide group feeds light at an angle not equal to 0°, directed to the optical axis of the module, into the associated optical waveguide (20, 30).

8. The module according to claim 2, wherein at least one indentation (201, 202) extends away from the light outlet surface, in such a way that light from the right and/or left optical waveguide group (20, 30) cannot enter the other left and/or right optical waveguide group (30, 20).

9. The module according to claim 2, wherein at least one indentation (201, 202) is designed away from the light outlet surface, in such a way that light from the central optical waveguide group or from the at least one central optical waveguide (40) cannot enter the left or right optical waveguide group or the at least one left or at least one right optical waveguide (20, 30).

10. The module according to claim 1, wherein at least one indentation (201, 202) between two light outlet surfaces (32, 42; 22, 42) extends upwardly away from the lower delimiting surfaces of the optical waveguides (20, 30, 40) arranged side by side or the lower delimiting surface (130) of the total-light optical waveguide (100).

11. The module according to claim 1, wherein the indentation (201, 202) between two light outlet surfaces (32, 42; 22, 42):
   does not extend completely as far as the upper delimiting surfaces of the optical waveguides (20, 30, 40) arranged side by side or as far as the upper delimiting surface (120) of the total-light optical waveguide (100), such that a continuous edge (121) is produced in the upper region of the optical waveguides arranged side by side or of the total-light optical waveguide (100), or
   extends completely as far as the upper delimiting surfaces of the optical waveguides (20, 30, 40) arranged side by side or as far as the upper delimiting surface (120) of the total-light optical waveguide (100).

12. The module according to claim 1, wherein at least one indentation (201, 202) in a front region has a defined width and tapers rearwardly, in a manner directed away from the light outlet surfaces (22, 32, 42; 110).

13. The module according to claim 12, wherein the defined width of the at least one indentation (201, 202) is constant over the entire height of the at least one indentation (201, 202).

14. The module according to claim 12, wherein the at least one indentation (201, 202) has delimiting walls (201', 201"; 202', 202"), which run towards one another.

15. The module according to claim 14, wherein the delimiting walls (201', 201"; 202', 202") converge at an acute angle (201''', 202''').

16. The module according to claim 14, wherein the inner wall (201", 202") of an indentation (201, 202) is configured in a planar manner.

17. The module according to claim 16, wherein the inner wall (201", 202") of the indentation (201, 202) is configured as a vertical plane.

18. The module according to claim 14 wherein the outer wall (201', 202') of an indentation (201, 202) is curved.

19. The module according to claim 18, wherein the outer wall (201', 202') of the indentation (201, 202) is curved away from the inner wall (201", 202").

20. The module according to claim 1, wherein the total optical waveguide (100) is configured on the rear side thereof facing away from the light decoupling surface (22, 32, 42) in such a way that light rays from one outer light source (2, 3) cannot exit through a light decoupling surface (32, 22) associated with another outer LED light source (3, 2).

21. The module according to claim 20, further comprising rear-side indentations (70) which block light from the outer LED light sources (2, 3) which would otherwise pass into the optical waveguide (30, 20) associated with another outer LED light source (3, 2).

22. The module according to claim 1, wherein a main beam distribution or a partial main beam distribution can be produced by means of the optical waveguides or by means of the total-light optical waveguide.

23. The module according to claim 1, wherein at least one LED light source (5, 6) is arranged above the optical waveguides (20, 30, 40) or the total-light optical waveguide (100) and emits light onto at least one optics, and wherein the light emitted from the at least one optics is radiated into a lower region of the projection lens (90), and wherein the upper edge (121), which delimits the total-light light outlet surface (110), is reproduced as a light/dark border in the light exposure.

24. The module according to claim 23, wherein two LED light sources (5, 6) are each provided with an associated reflector (7, 8).

25. The module according to claim 23 wherein the upper side (120) and/or the underside (130) of the optical waveguides or of the total-light optical waveguide (100) are configured so as to reflect light at least in regions.

26. The module according to claim 23, wherein the edge (121) is configured to form a light/dark border for a dipped headlight beam distribution.

27. The module according to claim 23, wherein the at least one optics is a reflector (7,8).

28. A headlight comprising one or more modules according to claim 1.

29. The headlight according to claim 28, wherein at least one of the modules is pivotable about a substantially vertical axis.

30. The headlight according to claim 29, wherein all of the modules are pivotable about a substantially vertical axis.

31. The headlight according to claim 28, wherein the projection lens of one or more modules is pivotable about one or more respective vertical axes.

32. The headlight according to claim 31, wherein the axis runs through the focal point of the projection lens.

* * * * *